No. 632,187. Patented Aug. 29, 1899.
J. JOYCE.
SASH FASTENER.
(Application filed Sept. 27, 1898.)
(No Model.)
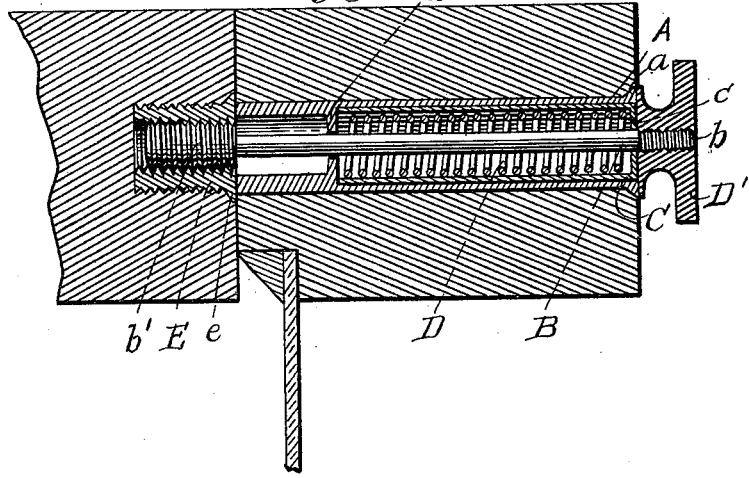
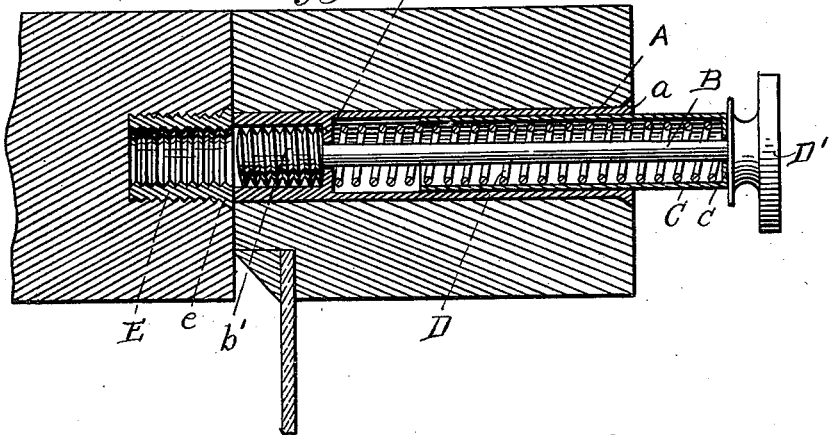
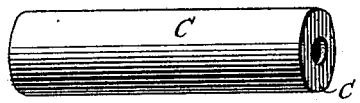
WITNESSES:
Edwin G. McKee
G. M. Anderson
INVENTOR
James Joyce
BY
E W Anderson
his ATTORNEY.
THE NORRIS PETERS CO., PHOTO-LITHO., WASHINGTON, D. C.

UNITED STATES PATENT OFFICE.

JAMES JOYCE, OF BELLEVUE, KENTUCKY.

SASH-FASTENER.

SPECIFICATION forming part of Letters Patent No. 632,187, dated August 29, 1899.

Application filed September 27, 1898. Serial No. 692,025. (No model.)

*To all whom it may concern:*

Be it known that I, JAMES JOYCE, a citizen of the United States, and a resident of Bellevue, in the county of Campbell and State of Kentucky, have invented certain new and useful Improvements in Sash-Fasteners; and I do declare the following to be a full, clear, and exact description of the invention, such as will enable others skilled in the art to which it appertains to make and use the same, reference being had to the accompanying drawings, and to letters of reference marked thereon, which form a part of this specification.

Figure 1 is a central vertical section showing my invention as applied and the sashes locked. Fig. 2 is a similar view showing the sashes unlocked. Fig. 3 is a detail view of the sleeve.

This invention is designed to provide an improved sash-fastener for the meeting-rails of window-sashes; and it consists in the novel construction and combination of parts, all as hereinafter described, and pointed out in the appended claim.

Referring to the accompanying drawings, the letter A designates a tubular casing which is designed to be seated in the top rail of a lower sash, its outer end being flanged, as shown at $a$, to adapt it to a countersink in said rail. It is also formed with a partition $a'$ near its inner end, and beyond which its bore is of somewhat less diameter.

B designates a bolt having a reduced threaded portion $b$ at its outer end and an enlarged threaded portion $b'$ at its inner end. This bolt is of considerably greater length than the casing A, through which it loosely extends.

C designates a sleeve which is adapted to telescopically fit within the outer compartment of said casing, being equal in length to said compartment. The opening at the outer end of said sleeve is of reduced diameter owing to the inturned flange $c$ thereat, in which and the partition $a'$ of the casing the bolt D has loose bearings.

D designates a helical spring whose inner end is seated against the internal flange $a'$ and whose outer end seats against the shoulder $c$ of the tube C, which fits over said spring.

D' is a nut which is screwed on the threaded portion $b$ of the bolt, against the outer end of the sleeve C.

E is a bushing having an external thread to engage its seat in the meeting-rail of the upper sash and an internal thread to receive the threaded portion $b'$ of the bolt. Its outer end is flanged, as indicated at $e$, to adapt it to a countersunk portion of its seat.

In operation to lock the sashes the nut D is pressed and at the same time turned to cause the threaded portion $b'$ to engage the internal thread of the bushing E. To release the lock, the nut is turned in the opposite direction, the spring acting to retract the bolt as soon as it is disengaged from the thread of the bushing.

It will be observed that my sleeve C forms an efficient protecting-inclosure for the helical spring in all positions thereof, that the sleeve will prevent friction of the coils of the spring against the casing-walls owing to the fact that when the coils open or close the sleeve moves therewith, that said sleeve enables a long spring to be employed without lengthening the casing, and that it prevents the outer end of the bolt from working loose through wear of its bearings, such wear being distributed over the larger frictional surface of the sleeve and accordingly lessened. It will also be observed that the enlarged threaded end portion $b'$ of the bolt will form a stop for said bolt when retracted.

Having thus described my invention, what I claim as new, and desire to secure by Letters Patent, is—

The herein-described window-fastening, consisting of the tubular casing, having the partition near its inner end; the sleeve telescopically fitting in said casing and having an inturned flange at its outer end; the headed bolt having loose bearings in said casing in the partition thereof and in the flange of the sleeve, and having a threaded inner end portion; the helical spring surrounding the bolt and surrounded by the sleeve, and having a bearing at one extremity against said partition and at its opposite extremity against the flange of the sleeve; and the internally-threaded bushing adapted to be engaged by the said threaded portion of the bolt, substantially as specified.

In testimony whereof I affix my signature in presence of two witnesses.

JAMES JOYCE.

Witnesses:
HENRY PAUL,
ANTON KREBS.